(12) United States Patent
Bausch et al.

(10) Patent No.: US 8,586,225 B1
(45) Date of Patent: Nov. 19, 2013

(54) BATTERY ASSEMBLY FOR AN ELECTRONIC DEVICE

(75) Inventors: Michael E. Bausch, Livonia, NY (US); Jose Ricardo Duran, Williamson, NY (US); David Cipolla, Macedon, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/590,248

(22) Filed: Aug. 21, 2012

(51) Int. Cl.
*H01M 2/10* (2006.01)

(52) U.S. Cl.
USPC .......................................... 429/97; 429/163

(58) Field of Classification Search
None
See application file for complete search history.

(56) References Cited

U.S. PATENT DOCUMENTS

| | | | |
|---|---|---|---|
| 4,493,880 A * | 1/1985 | Lund .............................. | 429/97 |
| 5,460,906 A | 10/1995 | Leon et al. | |
| 5,535,437 A | 7/1996 | Karl et al. | |
| 5,869,204 A | 2/1999 | Kottke et al. | |
| 5,895,729 A | 4/1999 | Phelps, III et al. | |
| 6,730,432 B1 | 5/2004 | Grosfeld et al. | |
| 2006/0121338 A1* | 6/2006 | Ge et al. .......................... | 429/97 |
| 2007/0048599 A1* | 3/2007 | Choi .............................. | 429/97 |
| 2008/0268329 A1 | 10/2008 | Mackle et al. | |
| 2011/0098058 A1* | 4/2011 | Mahalingam .............. | 455/456.1 |

* cited by examiner

*Primary Examiner* — Milton I Cano
*Assistant Examiner* — Carmen Lyles-Irving
(74) *Attorney, Agent, or Firm* — Fox Rothschild, LLP; Robert J. Sacco

(57) ABSTRACT

Systems and methods (1200, 1300) for attaching/detaching a battery assembly (106) from an electronic device. The battery assembly comprises top and bottom covers (112, 304) coupled together. First latches (206*a*, 206*b*) protrude out and away from a first end edge portion of the top cover. The first latches rotate into latching engagement with first latch surfaces (402) of the electronic device (100). Second latches (302*a*, 302*b*) protrude out and away from a second end edge portion of the bottom cover which is opposed from the first end edge portion of the top cover. The second latches snap into latching engagement with second latch surfaces (308*a*, 308*b*) of the electronic device. Dual-action buttons (110*a*, 110*b*) facilitate the latching engagement/disengagement of the second latches to/from the electronic device. The first and second latches facilitate a deflection of the battery assembly towards the electronic device when the battery assembly is attached thereto.

15 Claims, 11 Drawing Sheets

BATTERY ASSEMBLY FOR AN ELECTRONIC DEVICE

BACKGROUND OF THE INVENTION

1. Statement of the Technical Field

The invention concerns electronic devices comprising one or more batteries. More particularly, the invention concerns battery assemblies configured for removably coupling batteries to electronic devices.

2. Description of the Related Art

Electronic devices which comprise internal circuit components are typically powered by external batteries. These external batteries are often housed in a battery compartment of the electric device in a manner enabling an electrical connection between the battery and the internal circuit components via electrical contacts. When the batteries are discharged, they may be replaced with charged batteries. Accordingly, the batteries are often removably coupled to the electronic device. Various mechanisms are known in the art for removably coupling batteries to electronic devices. Such mechanisms comprise screws, quarter-turn fasteners, single action spring loaded latches, and double action latches.

SUMMARY OF THE INVENTION

Embodiments of the present invention concern systems and methods for attaching a battery assembly to an electronic device. The methods involve; inserting at least two first latches of the battery assembly into respective ones of at least two cavities formed in a main body of the electronic device; rotating the battery assembly towards the main body of the electronic device such that the first latches latchingly engage with curved latch surfaces of the cavities; and applying a force to the battery assembly such that a plurality of second latches of the battery assembly snappingly engage with respective latch surfaces of the main body of the electronic device; and deflecting the battery assembly towards the electronic device after the second latches snappingly engage the respective latch surfaces.

Embodiments of the present invention also concern systems and methods for detaching a battering assembly from an electronic device. The methods involve: simultaneously applying a first pushing force to at least two buttons of the battery assembly in a direction parallel to a width axis of the electronic device and towards the electronic device; simultaneously applying a second pushing force to the buttons in opposed directions perpendicular to the width axis and towards the electronic device until first latches of the battery assembly disengage respective latch surfaces of a main body of the electronic device; rotating the battery assembly away from the main body of the electronic device such that second latches of the battery assembly disengage curved latch surfaces of cavities formed in the main body of the electronic device; and lifting the battery assembly away from the electronic device.

Embodiments of the present invention further concern battery assemblies. Each battery assembly comprises top and bottom covers coupled together. At least two first latches protrude out and away from a first end edge portion of the top cover. The first latches are configured to be rotated into latching engagement with first latch surfaces of an electronic device. At least two second latches protrude out and away from a second end edge portion of the bottom cover which is opposed from the first end edge portion of the top cover. The second latches are configured to be snapped into latching engagement with second latch surfaces of the electronic device. A spring is provided which exerts a spring force against the second latches. At least two buttons are provided for facilitating the latching engagement and disengagement of the second latches to and from the electronic device. Each button sits within a battery compartment. The button compartment is configured to facilitate linear movement of the button and rotational movement of the button about cam surfaces of the second latches. Notably, the first and second latches are configured to facilitate a deflection of the battery assembly towards the electronic device when the battery assembly is attached thereto.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
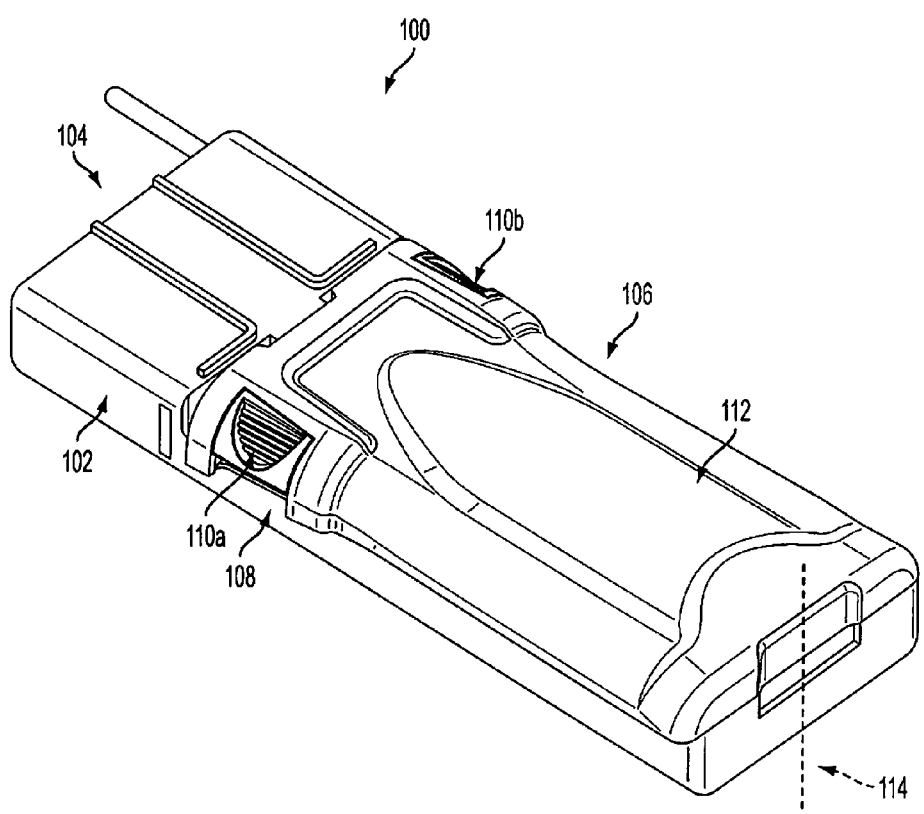
FIG. 1 is a back perspective view of an exemplary electronic device that is useful for understanding the present invention.

Embodiments of the present invention will now be described with respect to FIGS. 1-11C. Embodiments of the present invention generally relate to electronic devices comprising one or more batteries removably coupled thereto via latching mechanisms. Such electronic devices can include, but are not limited to, radios, mobile telephones, cellular telephones, video cameras, recording devices, digital cameras, sensors, garage door openers, smoke alarms and other electronic devices. The latching mechanisms are configured to provide an intrinsically safe connection to the electronic devices such that explosions do not occur. In this regard, inadvertent sparks or arcs at the electrical contacts of the batteries do not occur when the batteries are coupled and/or decoupled from the electronic devices. The latching mechanisms are also configured to prevent the batteries from being dislodged or decoupled from the electronic devices due to external forces. Such external forces include, but are not limited to, impact forces produced by dropping an electronic device. The latching mechanisms are further configured to prevent battery contact chatter as a result of external vibration or mechanical shock. The latching mechanisms are also designed to: facilitate the attachment and detachment of a battery to/from an electronic device via an intuitive process using one hand and no tools (e.g., a screw driver); prevent the battery from being displaced from electrical contacts; prevent debris from entering a battery compartment; and allow access for easy cleanout of any debris that enters the latch compartment.

Notably, the latching mechanisms of the present invention overcome certain drawbacks of conventional battery latches. For example, the latching mechanisms of the present invention require no tools (e.g., screw drivers) for attaching and detaching a battery assembly from an electronic device, and therefore are less manually complex and costly solutions than conventional fastener based mechanisms (e.g., screws). Also, each latching mechanism of the present invention comprises a multi-action latch such that the latches do not inadvertently disengage a chassis of an electronic device due to external forces, as is the case in conventional single action spring loaded latches. Furthermore, the latching mechanisms of the present invention provide more robust solutions as compared to dual action slider based mechanisms.

The latching mechanisms of the present invention are designed to advantageously pull batteries toward the electronic devices such that battery contact chatter does not occur as a result of vibration or mechanical shock. In conventional battery latch solutions, the batteries are pushed away from electronic devices via spring forces. Consequently, battery contact chatter often occurs in such electronic devices as a result of vibration or mechanical shock. Therefore, the intrinsic value of electronic devices employing such conventional battery latch solutions is less than that of the electronic devices employing the latching mechanisms of the present invention.

Before describing the latching mechanism of the present invention, it will be helpful in understanding an exemplary environment in which the invention can be utilized. In this regard, it should be understood that the latching mechanisms of the present invention can be utilized in a variety of different applications where removable batteries are needed for powering circuit components of an electronic device. Such applications include, but are not limited to, radio applications, mobile/cellular telephone applications, visual/audio recording applications, camera applications, sensor applications, garage door opener applications, smoke alarm applications, television controller applications, and other military/commercial electronic device applications.

Figure 2:
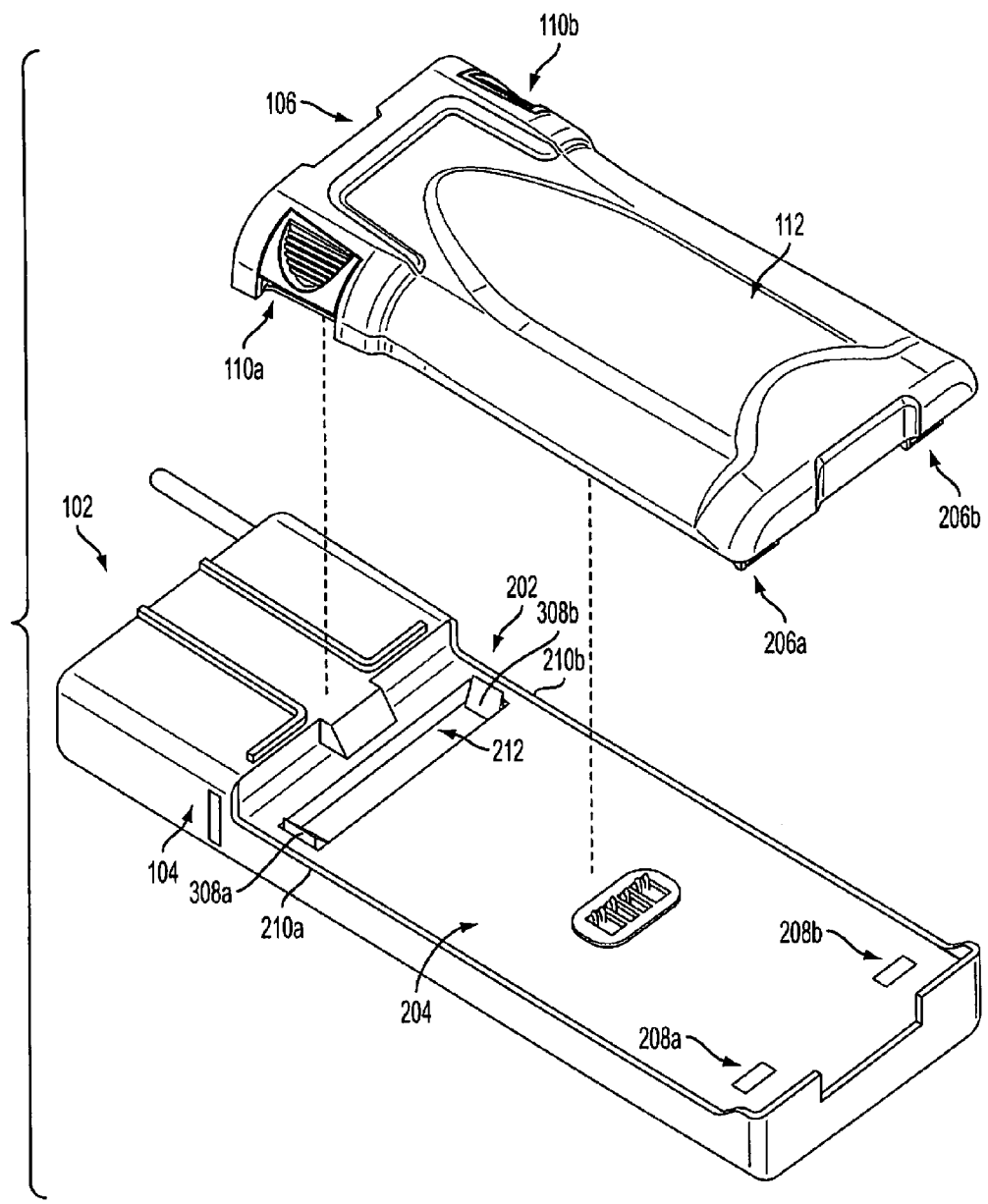
FIG. 2 is a back perspective view of an exemplary electronic device having a battery cover and a battery removed therefrom.

Referring now to FIGS. 1-2, there are provided schematic illustrations of an exemplary electronic device 100 that is useful for understanding the present invention. Although the electronic device 100 is shown to be a radio, the invention is not limited in this regard. For example, the electronic device 100 can be a radio, a mobile telephone, a cellular telephone, a video camera, a recording device, a camera, a sensor, a garage door opener, a smoke alarm, a television controller, or any other electronic device.

As shown in FIGS. 1-2, the electronic device 100 generally comprises a housing 102 configured to house circuits (not shown), a battery (e.g., battery 702 shown in FIG. 7), and other electronic components (not shown). The battery is provided for supplying power to the electronic components (not shown) during operation of the electronic device 100. In this regard, the battery can include, but is not limited to, a single cell battery or a multiple cell battery. The term "cell", as used herein, includes any type of electrochemical cell including an electrolytic cell, a galvanic cell, a voltaic cell, a fuel cell and a flow cell.

Housing 102 can be formed from any conductive or non-conductive material. Such conductive materials include, but are not limited to, metal materials and composite materials. Such non-conductive materials include, but are not limited to, rubbers and plastics. In some embodiments, the housing material is selected to withstand high temperatures and/or harsh environmental conditions such that the internal components of the electronic device 100 are protected from damage from external factors.

Housing 102 is comprised of a main body 104 and a battery assembly 106 coupled to the main body 104 via a "triple action" latching mechanism 108. The latching mechanism 108 will be described in detail below. The battery assembly 106 is configured to allow: the attachment of at least one battery (not shown) to the electronic device 100; and the detachment of the battery (not shown) from the electronic device 100.

The battery attachment is accomplished by coupling the battery assembly 106 to a back wall 204 of a battery compartment 202 of the electronic device 100, as shown in FIG. 1. The battery assembly 106 is coupled to the back wall 204 by inserting bottom latches 206a, 206b into cavities 208a, 208b formed in back wall 204, and then rotating the battery assembly 106 towards the electronic device 100. Thereafter, top latches (not visible in FIGS. 1-2) are latched to the back wall 204. The top latches are latched by applying a force to the battery assembly 106 such that the top latches are snapped into engagement with latch surfaces 210a, 210b of the back wall 204.

Figure 3:
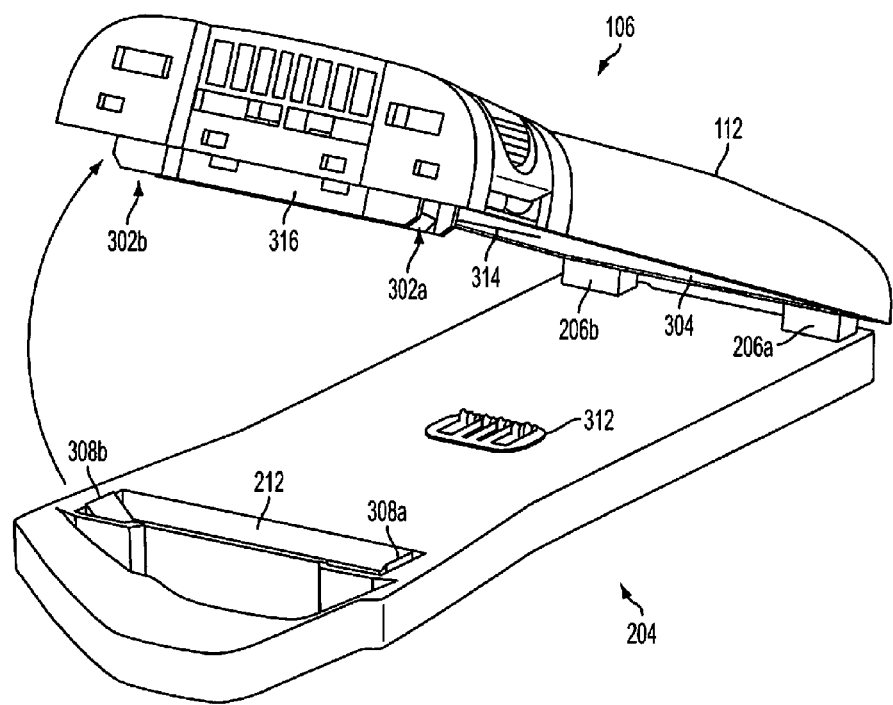
FIG. 3 is a schematic illustration of a battery assembly being detached from a bottom wall of a battery compartment of a chassis of an electronic device.
Figure 4:
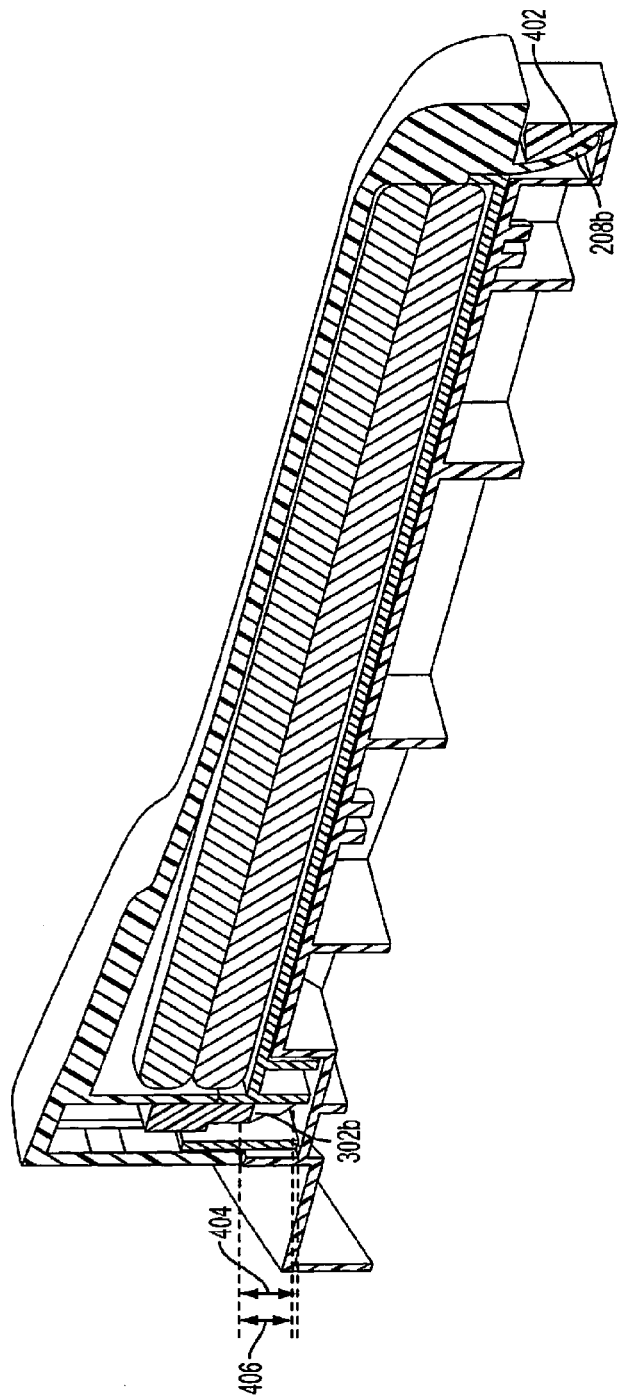
FIG. 4 is a cross-section view of a battery assembly attached to a bottom wall of a battery compartment of a chassis of an electronic device.

The battery removal is accomplished by the de-coupling of the battery assembly 106 from a back wall 204 of a battery compartment 202 of the electronic device 100, as shown in FIGS. 2-4. The battery assembly 106 is decoupled from the back wall 204 by releasing the top latches (not visible in FIGS. 1-2) and bottom latches 206a, 206b of the latch mechanism 108. The top latches (not visible in FIGS. 1-2) are unlatched or released by simultaneously pushing and rotating the buttons 110a, 110b, as will be described in detail below in relation to FIGS. 11A-11C. The bottom latches 206a, 206b are unlatched by rotating the battery assembly 106 up and away from the bottom wall 204 subsequent to the release of the top latches, as shown in FIG. 3.

As shown in FIGS. 2-3, the top latches 302a, 302b and bottom latches 206a, 206b protrude out and away from a bottom cover 304 of the battery assembly 106. As such, the back wall 204 of the battery compartment 202 comprises a cavity 212 sized and shaped for receiving the top latches 302a, 302b. In this regard, it should be understood that the cavity 212 has latch surfaces 308a, 308b configured for engaging the top latches 302a, 302b. In this regard, each latch surface 308a, 308b comprises a hook which facilitate snapping of a respective top latch 302a, 302b into engagement therewith.

The back wall 204 also comprises cavities 208a, 208b sized and shaped for rotatably receiving bottom latches 206a, 206b. In this regard, it should be understood that each bottom latch 206a, 206b comprises a radially outward extending hook having a curved profile selected for rotatably engaging a complimentarily curved sidewall 402 of a respective cavity 208a, 208b, as shown in FIG. 4. Such a "curved hook-like" latch configuration facilitates the deflection of the battery assembly 106 towards the electronic device 100. As mentioned above, this deflection or pulling feature of the present invention ensures that battery contact chatter does not occur between electrical contacts 312, 314 as a result of vibration or shock. In some embodiments, the bottom latches 206a, 206b are integrally formed with a top cover 112 of the battery assembly 106. Alternatively, the bottom latches 206a, 206b can include separate components that are coupled to the top cover 112 via an adhesive or other coupling means.

As also shown in FIGS. 3-4, the battery assembly 106 comprises a latch shroud 316. The latch shroud 316 is configured to protect the top latches 302a, 302b from damage when the electronic device 100 is subjected to external forces (e.g., impact forces produced by dropping the electronic device). In this regard, a protruding portion of the latch shroud 316 has a height 404 that is greater than the height 406 of a protruding portion of each top latch 302a, 302b. As such, internal forces produced by the mechanical shock are applied to the latch shroud 316, rather than to the top latches 302a, 302b. The latch shroud 316 is also configured to protect the bottom latches 206a, 206b. In this regard, the latch shroud 316 interlocks with the cavity 212 formed on the back wall 204 of the electronic device 100. In effect, the internal forces produced by mechanical shock are absorbed by the latch shroud 316 before the internal forces reach the bottom latches 206a, 206b. The latch shroud 316 can have a shape, size and configuration different than that shown in the drawings of this document, provided that it can perform the above-described functions. However, the latch shroud 316 must be sized and shaped to fit within the cavity 212 of the back wall 204. Also, the latch shroud 316 can be integrally formed with the bottom cover 304 of the battery assembly 106. Alternatively, the latch shroud 316 can include at least one separate component that is coupled to the bottom cover 304 via an adhesive or other coupling means.

Figure 5:
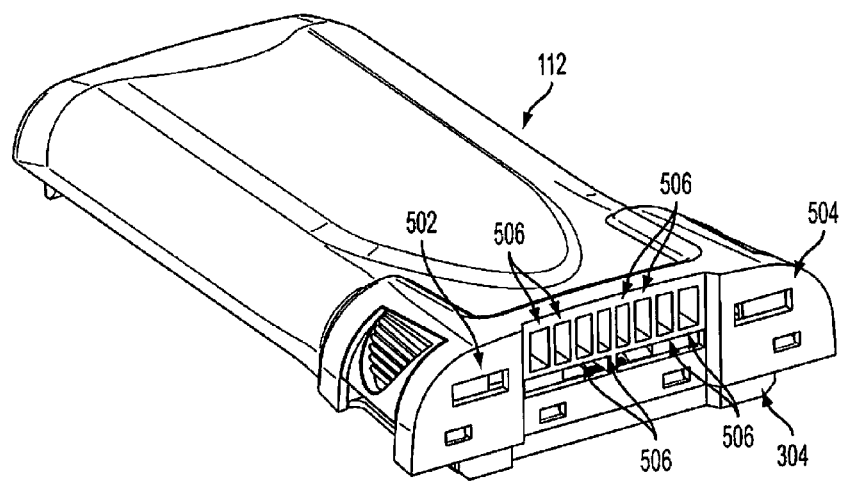
FIG. 5 is a top perspective view of a battery assembly that is useful for understanding the present invention.
Figure 6:
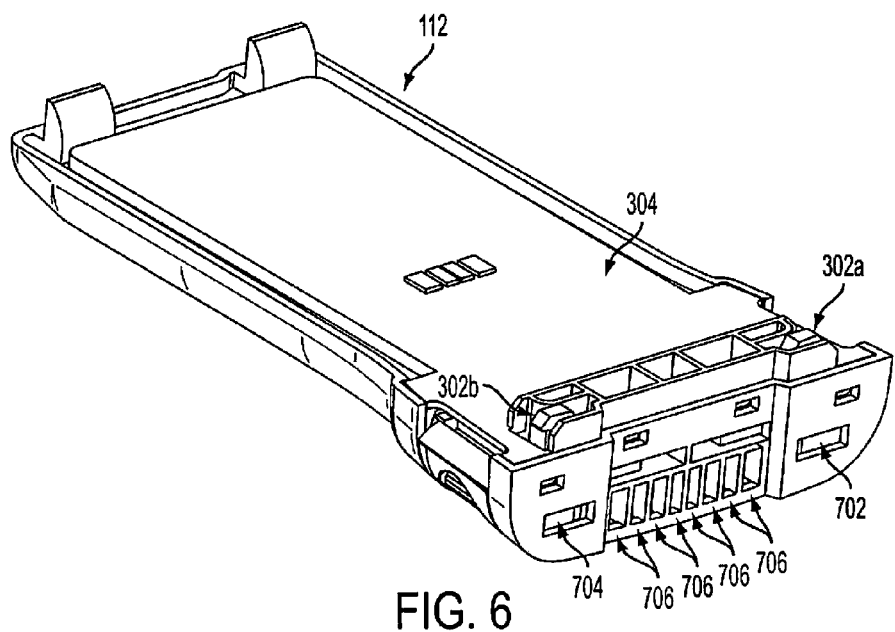
FIG. 6 is a bottom perspective view of a battery assembly that is useful for understanding the present invention.

As shown in FIGS. 5-6, the top cover 112 of the battery assembly 106 has a plurality of through-hole apertures 502, 504, 506 formed therethrough. The apertures 502, 504, 506 allow access for easy cleanout of any debris that enters the latch compartment (not shown in FIGS. 5-6). For example, if the electronic device 100 is dropped on wet ground, then mud may enter the latch compartment (not shown in FIGS. 5-6). As a result, the top latches 302a, 302b may not operate in their intended manner. In this scenario, a user may squirt water, insert a brush or insert a cloth into the latch compartment via the through-hole apertures 502, 504, 506 for purposes of removing the mud and any other debris therefrom.

Figure 7:
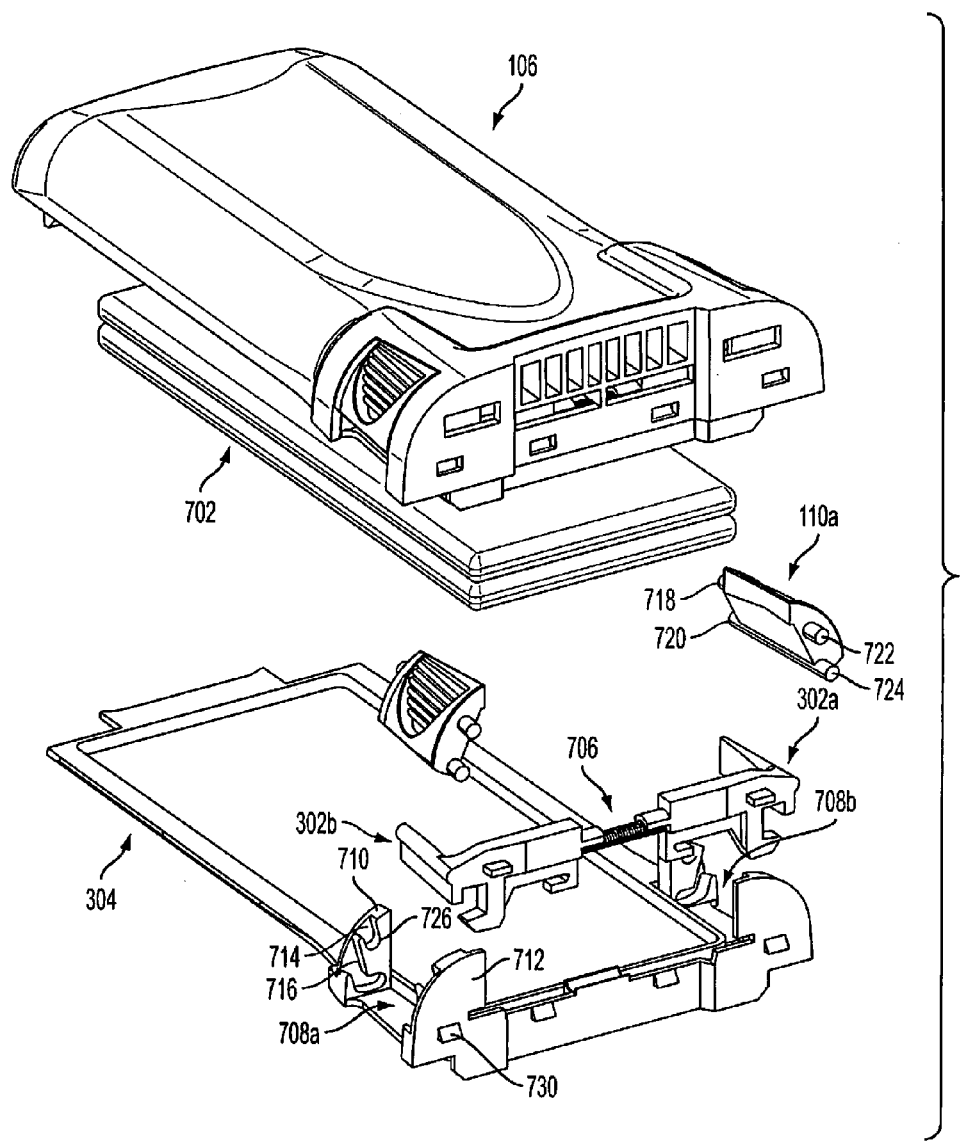
FIG. 7 is an exploded view of the battery assembly shown in FIGS. 5-6.

An exploded view of the battery assembly 106 is provided in FIG. 7. As shown in FIG. 7, the battery assembly 106 comprises a multi-component top latch assembly 704. The top latch assembly includes buttons 110a, 110b, button compartments 708a, 708b, top latches 302a, 302b, and a spring 706. The spring 706 is designed to accommodate the average one time (not repetitive) pinching ability of the average female when fully compressed. The spring must also be able to exert sufficient force to ensure that the top latches 302a, 302b are properly seated in operation. In some embodiments, the spring 706 is designed to store three to nine pounds of energy when compressed.

Each button compartment 708a, 708b includes two sidewalls 710, 712. Sidewall 710 is integrally formed with the bottom cover 304 of the battery assembly 106. In contrast, sidewall 712 includes a separate component that is attached to the bottom cover 304 via a plurality of coupling means 730. Embodiments of the present invention are not limited in this regard. For example, sidewall 710 can alternatively comprise a separate component that is attached to the bottom cover 304 via an adhesive or other coupling means.

Each sidewall 710, 712 is configured to facilitate the dual action (i.e., the up/down or linear movement and the rotational movement) of a respective button 110a, 110b. In this regard, each side wall 710, 712 comprises two grooves 714, 716. Each groove 714, 716 is sized and shaped for receiving at least a portion of a respective post 718, 720, 722, 724 of a respective button 110a, 110b. A first groove 714 is a straight groove with a rounded end 726 which facilitates the up and down (or linear) movement of a respective button 110a, 110b (i.e., the transition from a start position to a first stop position (and vice versa) as will be described below in relation to FIGS. 11A-11C). A second groove 716 is a substantially J-shaped groove which facilitates the up/down (or linear) movement and the rotational movement of the respective button 110a, 110b (i.e., the transition from a first stop position to a second stop position (and vice versa) as will be described below in relation to FIGS. 11A-11C).

Figure 8:
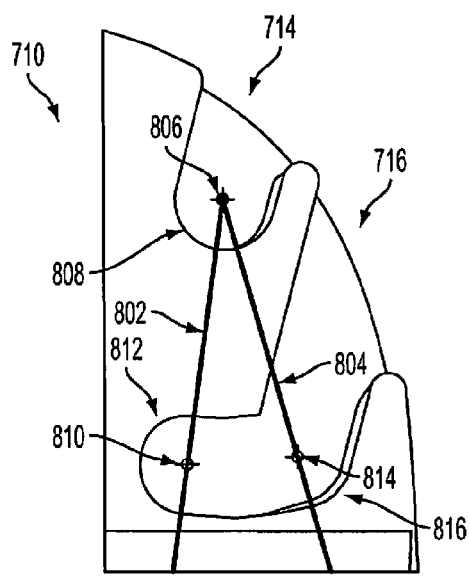
FIG. 8 is front view of a portion of a sidewall of a battery compartment shown in FIG. 7.

As shown in FIG. 8, the grooves 714, 716 are designed such that an angle of N degrees (e.g., thirty degrees) is formed by two rays 802, 804 sharing a common end point 806. The common end point 806 is the center point of a circle partially defined by an arch 808. Ray 802 is defined by a line which extends from the common end point 806 and passes through a center point 810 of a circle partially defined by an arc 812. Ray 804 is defined by a line which extends from the common end point 806 and passes through a center point 814 of a circle partially defined by an arc 816. In some embodiments, the value of N is determined based on the distance each top latch 302a, 302b is required to move to clear the chassis during latching and unlatching processes.

Figure 9:
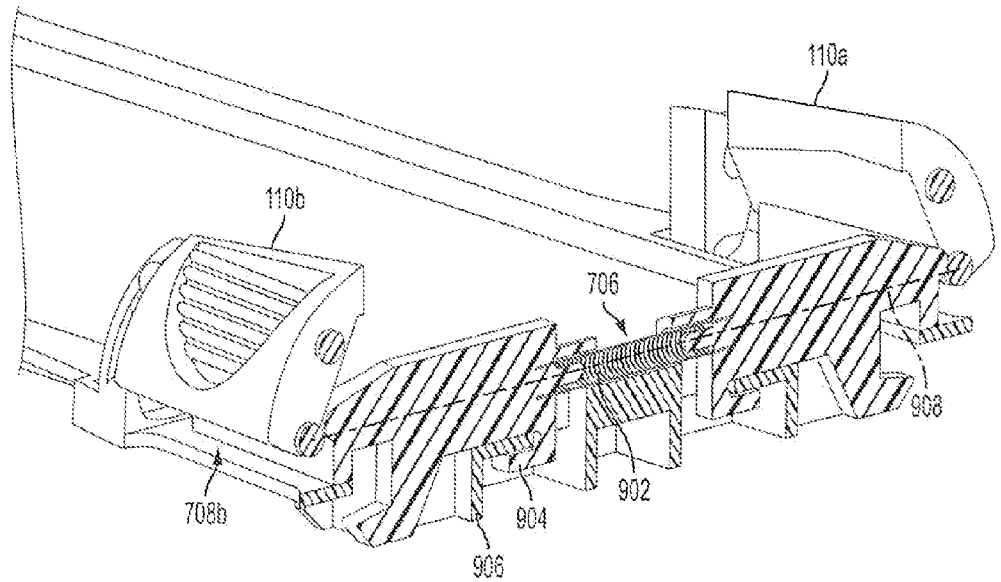
FIGS. 9-10 provide schematic illustrations of a portion of the battery assembly of FIGS. 5-6 that are useful for understanding how a multi-component top latch assembly is assembled.
Figure 10:
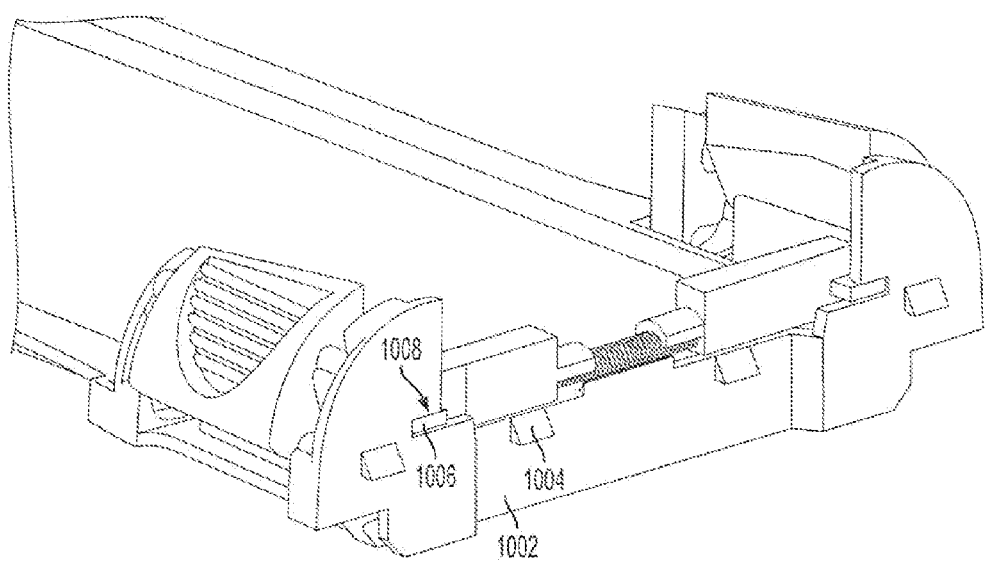

The manner in which the multi-component top latch assembly 704 is assembled is schematically illustrated in FIGS. 9-10. As shown in FIG. 9, the buttons 110a, 110b are first placed into the button compartment 708a, 708b such that at least a portion of two of their posts 718, 720, 722, 724 sit within the respective grooves 714, 716 of a respective sidewall 710. Next, the spring 706 is inserted into an aperture 902 of each top latch 302a, 302b so as to form a two-latch assembly. The two-latch assembly is then movably coupled to the bottom cover 304. This movable coupling is achieved by engaging an L-shaped hook 904 of each top latch 302a, 302b with an L-shaped hook 906 of the bottom cover 304. These hooks 904, 906 allow the two-latch assembly to be held in place without the presence of the top cover 112 of the battery assembly 106. In this regard, it should be understood that the hooks 904, 906 are configured to counteract any movement of the top latches 302a, 302b created by the spring 706 which would force the top latches 302a, 302b out of their intended assembly position. After engaging the hooks 904, 906, a base plate 1002 is coupled to the bottom cover 304 such that two posts 718, 720, 722, 724 of each button 110a, 110b sit within the respective grooves 714, 716 of a respective sidewall 712. In some embodiments, the base plate 1002 is coupled to the bottom cover 304 via one or more mechanical coupling mechanisms 1004. As shown in FIG. 10, these mechanical coupling mechanisms 1004 can include snap-hooks. Still, embodiments are not limited in this regard.

As also shown in FIG. 10, each top latch 302a, 302b comprises a horizontally elongated protrusion 1006 which slidingly engages a groove 1008 formed in the base plate 1002. The protrusions 1006 and grooves 1008 are provided to ensure that the two-latch assembly is held in place without the presence of the top cover 112 of the battery assembly 106. The protrusions 1006, grooves 1008 and hooks 904, 906 further ensure that the top latches 302a, 302b remain aligned with a horizontal axis 908 during and after assembly thereof.

Figure 11A:
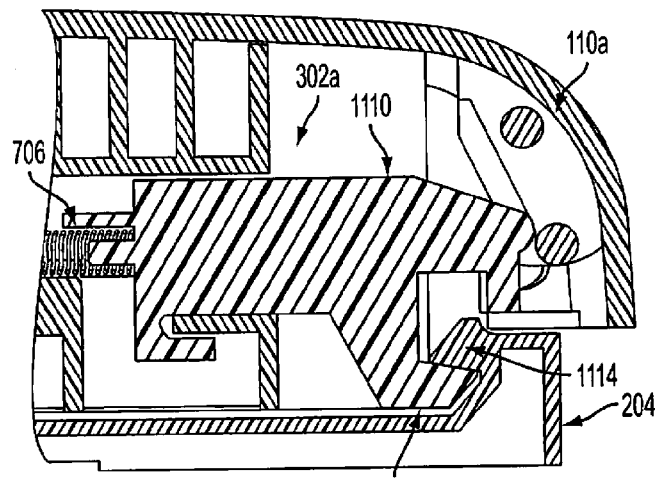
FIGS. 11A-11C provide schematic illustrations of a portion of the battery assembly that is useful for understanding the mechanics involved in unlatching top latches thereof.

The mechanics involved in unlatching the top latches 302a, 302b of the battery assembly 106 will now be described in more detail in relation to FIGS. 11A-11C. The staring position (or un-actuated position) of a button 110a is shown in FIG. 11A. The button 110a is pushed into its starting position by the top latch 302a as a result of a spring force of spring 706. In the starting position, a hook 1112 of the top latch 302a fully engages a hook 1114 of a back wall 204 of a battery compartment 202 of an electronic device (e.g., electronic device 100 of FIG. 1).

Figure 11B:
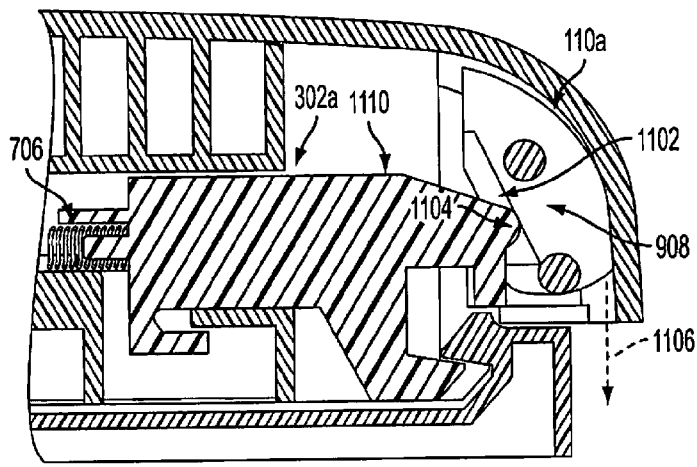

When the top latches are to be disengaged from a chassis of the electronic device (e.g., electronic device 100 of FIG. 1), an operator applies force on the button 110a such that it travels in a downward direction 1106 until it reaches its first stop position, as shown in FIG. 11B. When the button 110a travels in the downward direction 1106, a cam surface 1102 of the button 110a slides against a cam surface 1104 of the top latch 302a. In the first stop position, the hook 1112 of the top latch 302a is partially disengaged from a hook 1114 of a back wall 204 of a battery compartment 202 of an electronic device (e.g., electronic device 100 of FIG. 1).

Figure 11C:
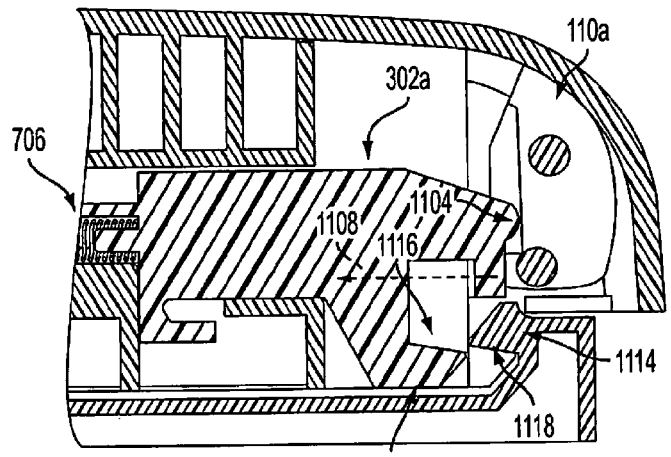

Next, the user applies force on the button 110a such that it rotates against the cam surface 1104 in an inward direction 1108 until it reaches it second stop position (or fully actuated position), as shown in FIG. 11C. In the second stop position, a hook 1112 of the top latch 302a is fully disengaged from a hook 1114 of a back wall 204 of a battery compartment 202 of the electronic device 100.

As shown in FIGS. 11A-11C, engagement surfaces 1116, 1118 of the hooks 1112, 1114 are angled with respect to a top surface 1110 of the top latch 302a. The value of this angle is selected so as to define the amount of sliding force required to deflect the spring 706. The greater the angle, the more sliding force required to deflect the spring. In some embodiments, the value of the angle falls within the range of twenty to thirty degrees.

Notably, the button 110a is designed such that its cam surface 1102 is angled relative to a top surface 1110 of the top latch 302a when it is in its starting position and its first stop position, as shown in FIGS. 11A and 11B. The value of the angle is selected such that the button 110a slides and rotates against the cam surface 1104 of the top latch 302a in a smooth manner. In some embodiments, the value of the angle falls within the range of forty to eighty degrees.

In view of the forgoing, the present invention provides a latch mechanism 108 configured to ensure that inadvertent disengagement of the battery assembly 106 does not occur. In this regard, the latch mechanism 108 requires that three actions be performed for detaching the battery assembly 106 from an electronic device (e.g., electronic device 100 of FIG. 1). The three actions include: the simultaneous actuation of two separate buttons 110a, 110b; the pushing and rotation of the buttons 110a, 110b to a hard stop so as to unlatch the top latches 302a, 302b; and the manual lifting and rotation of the battery assembly 106 so as to unlatch the bottom latches 206a, 206b.

The latch mechanism 108 also includes robust retention features. For example, the bottom latches 206a, 206b comprise rotation hooks that maximizes contact area with the latching hooks 402 of the back wall 204 of a battery compartment 202 of an electronic device. Also, the tapered retention features 1112, 1114 of the latch mechanism 108 forces the battery assembly 106 towards the electronic device, thereby preventing battery contact chatter from occurring as a result of vibration or mechanical shock.

The latch mechanism 108 includes push buttons 110a, 110b that are designed and positioned to allow the battery assembly 106 to be manually lifted off from the electronic device. This push button configuration allows the retention force of the battery assembly 106 to be toward the electrical connections. The latch mechanism 108 also includes a top latch arrangement that requires push and rotate cam actions of the buttons 110a, 110b. These push and rotate cam actions allow leverage to be applied as a mechanical advantage against the spring force for easy activation. As a result, the battery assembly 106 can be easily attached to and removed from an electronic device.

Figure 12:
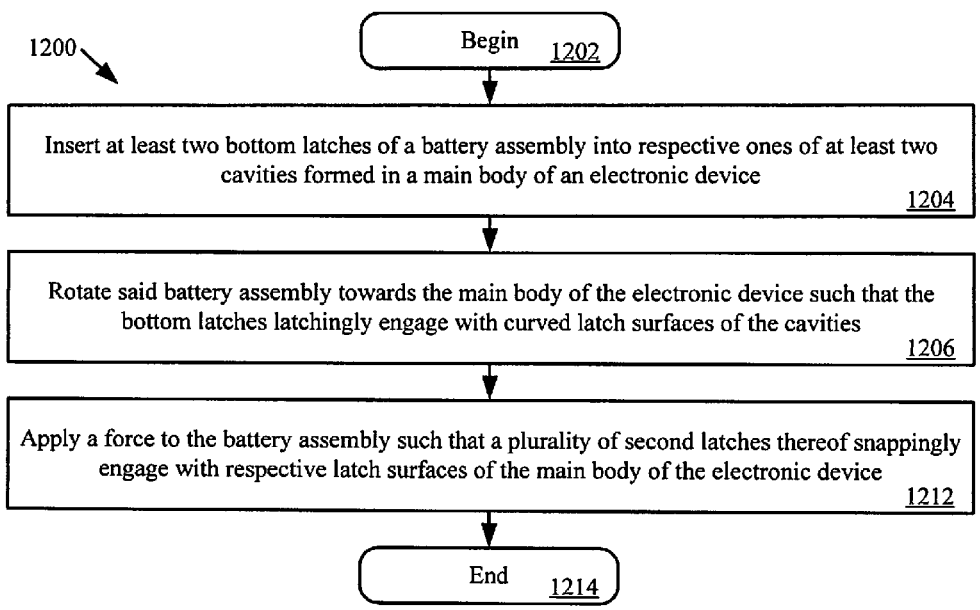
FIG. 12 provides a flow diagram of an exemplary method for attaching a battery assembly to an electronic device.

Referring now to FIG. 12, there is provided a flow diagram of an exemplary method 1200 for attaching a battery assembly (e.g., battery assembly 106 of FIGS. 1-11C) to an electronic device (e.g., electronic device 100 of FIGS. 1-2). The method begins with step 1202 and continues with steps 1204 and 1206 in which bottom latches (e.g., latches 206a, 206b of FIG. 2) of a battery assembly are coupled to the electronic device. In step 1204, at least two bottom latches (e.g., latches 206a, 206b of FIG. 2) of the battery assembly are inserted into respective ones of at least two cavities (e.g., cavities 208a, 208b) formed in a main body (e.g., main body 104 of FIG. 1) of the electronic device. The battery assembly is rotated towards the main body of the electronic device such that the bottom latches latchingly engage with curved latch surfaces (e.g., latch surfaces 402 of FIG. 4) of the cavities, as shown by step 1206.

Thereafter, step 1212 is performed for latching top latches (e.g., latches 302a, 302b of FIG. 3) of the battery assembly to the electronic device. In step 1212, a force is applied to the battery assembly such that the top latches of the battery assembly snappingly engage with respective latch surfaces (e.g., latch surfaces 308a, 308b of FIG. 3) of the main body of the electronic device. Subsequent to completing step 1212, step 1214 is performed where the method 1200 ends.

Figure 13:
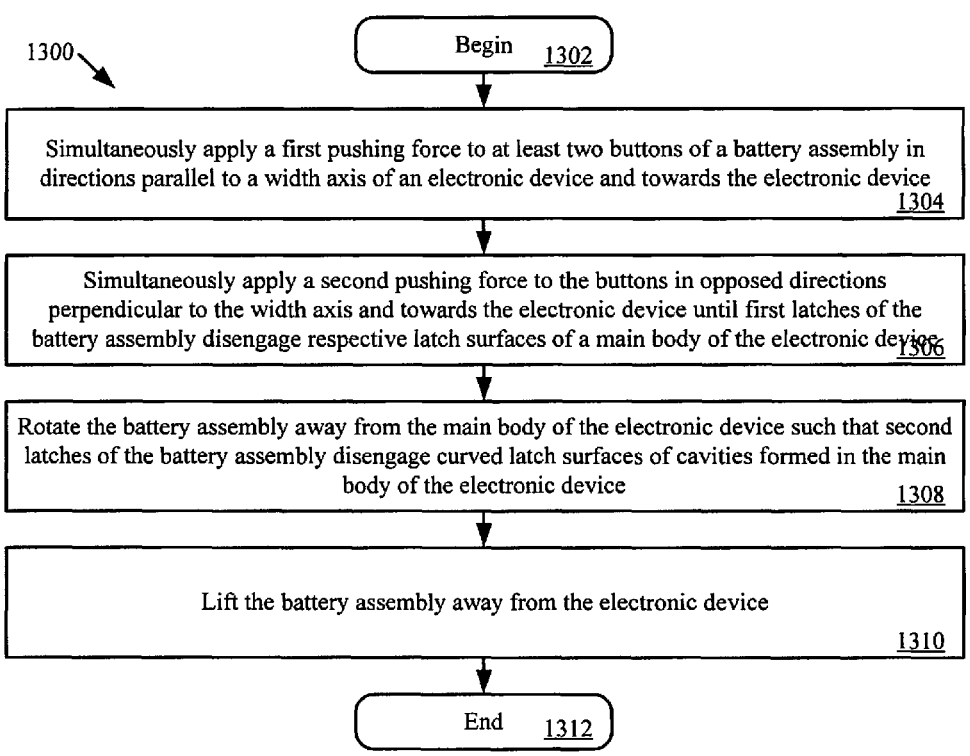
FIG. 13 provides a flow diagram of an exemplary method for detaching a battery assembly from an electronic device.

Referring now to FIG. 13, there is provided a flow diagram of an exemplary method 1300 for detaching a battering assembly (e.g., battery assembly 106 of FIGS. 1-11C) from an electronic device (e.g., electronic device 100 of FIGS. 1-2). The method 1300 begins with step 1302 and continues with step 1304. Step 1304 involves simultaneously applying a first pushing force to at least two buttons (e.g., buttons 110a, 110b) of the battery assembly in a direction parallel to a width axis (e.g., axis 114 of FIG. 1) of the electronic device and towards the electronic device. In a next step 1306, a second pushing force is simultaneously applied to the buttons in opposed directions perpendicular to the width axis and towards the electronic device until first latches (e.g., latches 302a, 302b of FIG. 3) of the battery assembly disengage respective latch surfaces (e.g., latch surfaces 308a, 308b of FIG. 3) of a main body (e.g., main body 104 of FIG. 1) of the electronic device. Thereafter, the battery assembly is rotated away from the main body of the electronic device such that second latches (e.g., latches 206a, 206b of FIG. 2) of the battery assembly disengage curved latch surfaces (e.g., latch surfaces 402 of FIG. 4) of cavities formed in the main body of the electronic device, as shown by step 1308. Once the second latches are fully disengaged from the curved latch surfaces, step 1310 is performed where the battery assembly is lifted away from the electronic device. Subsequent to completing step 1310, step 1312 is performed where the method 1300 ends.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

We claim:

1. A battery assembly, comprising:
   top and bottom covers coupled together;
   at least two first latches protruding out and away from a first end edge portion of said top cover, said first latches configured to be rotated into latching engagement with first latch surfaces of an electronic device; and
   at least two second latches protruding out and away from a second end edge portion of said bottom cover which is opposed from said first end edge portion of said top cover, said second latches configured to be snapped into latching engagement with second latch surfaces of said electronic device;
   at least two buttons configured to facilitate latching engagement and disengagement of said second latches to and from said electronic device
   wherein said first and second latches are configured to facilitate a deflection of said battery assembly towards said electronic device when said battery assembly is attached thereto.

2. The battery assembly of claim 1, further comprising a spring exerting a spring force against said second latches.

3. The battery assembly of claim 1, further comprising at least two button compartments configured to facilitate linear movement of said buttons and rotational movement of said buttons about cam surfaces of said second latches.

4. The battery assembly of claim 1, further comprising a battery disposed within an internal compartment formed between said top and bottom covers.

5. The battery assembly of claim 1, further comprising a latch shroud configured to protect said first and second latches from damage when an electronic device, to which said battery assembly is attached, is subjected to external forces.

6. The battery assembly of claim 5, wherein said latch shroud protrudes out and away from said bottom cover by an amount that is greater than an amount that said second latches protrude out and away from said bottom cover.

7. The battery assembly of claim 5, wherein said latch shroud encompasses three sides of each said second latch.

8. The battery assembly of claim 5, wherein said latch shroud is sized and shaped to interlock with a cavity formed in a housing of said electronic device.

9. The battery assembly of claim 1, further comprising at least one through-hole aperture formed in said top cover and configured to facilitate cleanout of debris that enters into an internal compartment formed between said top and bottom covers which are coupled together.

10. The battery assembly of claim 1, wherein each of said second latches comprises a hook with an angled engagement surface.

11. The battery assembly of claim 1, wherein each of said buttons comprises a cam surface that is angled relative to a horizontal axis of one of said second latches when it is in its un-actuated position and perpendicular to said horizontal axis when it is in its fully actuated position.

12. The battery assembly of claim 3, wherein each button compartment is defined by two sidewalls, each comprising at least one groove sized and shaped to receive a post of one of said buttons.

13. The battery assembly of claim 12, wherein at least one of said sidewalls is integrally formed with said bottom cover.

14. The battery assembly of claim 12, wherein at least one of said sidewalls is coupled to said bottom cover via a mechanical coupler.

15. The battery assembly of claim 12, wherein said groove is a straight groove with a rounded end configured to facilitate said linear movement of one of said buttons or a J-shaped groove configured to facilitate said rotational movement of one of said buttons.

* * * * *